US009817954B2

(12) United States Patent
Raley

(10) Patent No.: US 9,817,954 B2
(45) Date of Patent: Nov. 14, 2017

(54) MULTI-MODE PROTECTED CONTENT WRAPPER

(71) Applicant: CONTENTGUARD HOLDINGS, INC., Plano, TX (US)

(72) Inventor: Michael Charles Raley, Plano, TX (US)

(73) Assignee: CONTENTGUARD HOLDINGS, INC., Plano, TX (US)

( * ) Notice: Subject to any disclaimer, the term of this patent is extended or adjusted under 35 U.S.C. 154(b) by 222 days.

(21) Appl. No.: 14/837,648

(22) Filed: Aug. 27, 2015

(65) Prior Publication Data
US 2016/0063224 A1 Mar. 3, 2016

Related U.S. Application Data

(60) Provisional application No. 62/042,616, filed on Aug. 27, 2014, provisional application No. 62/042,622, (Continued)

(51) Int. Cl.
G06F 21/12 (2013.01)
G06F 21/10 (2013.01)
G06Q 10/06 (2012.01)
H04L 12/24 (2006.01)
G06F 21/62 (2013.01)
(Continued)

(52) U.S. Cl.
CPC .......... *G06F 21/105* (2013.01); *G06F 21/10* (2013.01); *G06F 21/12* (2013.01); *G06F 21/57* (2013.01); *G06F 21/6218* (2013.01); *G06F 21/6245* (2013.01); *G06Q 10/06* (2013.01); *H04L 41/0293* (2013.01); *H04L 63/102* (2013.01); *H04L 67/22* (2013.01);
(Continued)

(58) Field of Classification Search
None
See application file for complete search history.

(56) References Cited

U.S. PATENT DOCUMENTS 7,664,263 B2 * 2/2010 Moskowitz ............ G06F 21/10
380/205
7,743,259 B2 6/2010 Raley et al.
(Continued)

FOREIGN PATENT DOCUMENTS

WO 2016/033333 A1 3/2016

OTHER PUBLICATIONS

International Preliminary Report on Patentability and Written Opinion dated Mar. 9, 2017, in corresponding International Application No. PCT/US2015/047202, 6 pages.
(Continued)

*Primary Examiner* — Michael R Vaughan
*Assistant Examiner* — Richard A McCoy
(74) *Attorney, Agent, or Firm* — Rimon, P.C.; Marc S. Kaufman

(57) ABSTRACT

A method, apparatus, media and data structure for rendering a wrapper. The wrapper includes at least one data structure in a format that is renderable by a standard rendering engine and containing censored content comprising source content identification information. When the wrapper is opened by a standard rendering engine, the censored content is rendered. When opened by a trusted rendering engine, the source content is rendered.

28 Claims, 8 Drawing Sheets

Related U.S. Application Data filed on Aug. 27, 2014, provisional application No. 62/054,948, filed on Sep. 24, 2014, provisional application No. 62/054,949, filed on Sep. 24, 2014, provisional application No. 62/042,604, filed on Aug. 27, 2014, provisional application No. 62/054,947, filed on Sep. 24, 2014, provisional application No. 62/042,644, filed on Aug. 27, 2014, provisional application No. 62/042,619, filed on Aug. 27, 2014, provisional application No. 62/043,371, filed on Aug. 28, 2014, provisional application No. 62/043,370, filed on Aug. 28, 2014, provisional application No. 62/054,945, filed on Sep. 24, 2014, provisional application No. 62/054,944, filed on Sep. 24, 2014.

(51) Int. Cl.
*H04L 29/06* (2006.01)
*H04L 29/08* (2006.01)
*G06F 21/57* (2013.01)

(52) U.S. Cl.
CPC ............... *G06F 2221/2107* (2013.01); *G06F 2221/2115* (2013.01); *G06Q 2220/18* (2013.01)

(56) References Cited

U.S. PATENT DOCUMENTS

| | | | |
|---|---|---|---|
| 8,442,916 B2* | 5/2013 | Ta | G06F 21/10 380/277 |
| 8,538,907 B2 | 9/2013 | Freese et al. | |
| 2005/0004690 A1* | 1/2005 | Zhang | G10L 25/48 700/94 |
| 2005/0091498 A1* | 4/2005 | Williams | G11B 20/00086 713/176 |
| 2013/0163758 A1* | 6/2013 | Swaminathan | H04L 9/0819 380/259 |
| 2014/0079221 A1* | 3/2014 | McCallum | H04L 9/0822 380/277 |
| 2014/0115724 A1 | 4/2014 | van Brandenburg et al. | |

OTHER PUBLICATIONS

International Search Report and Written Opinion cited in corresponding International Application No. PCT/US15/47202 dated Nov. 30, 2015.

* cited by examiner

MULTI-MODE PROTECTED CONTENT WRAPPER

RELATED APPLICATION DATA

This application claims benefit to provisional application Ser. Nos. 62/042,616 filed on Aug. 27, 2014, 62/054,948 filed on Sep. 24, 2014, 62/042,622 filed on Aug. 27, 2014, 62/054,949 filed on Sep. 24, 2014, 62/042,604 filed on Aug. 27, 2014, 62/054,947 filed on Sep. 24, 2014, 62/042,644 filed on Aug. 27, 2014, 62/043,370 filed on Aug. 28, 2014, 62/054,945 filed on Sep. 24, 2014, 62/042,619 filed on Aug. 27, 2014, 62/043,371 filed on Aug. 28, 2014, 62/054,944 filed on Sep. 24, 2014, the disclosures of which are incorporated herein by reference.

FIELD OF THE INVENTION

The disclosure generally relates to the field of content distribution and more particularly to the method, system and media for reconstructing protected content a first mode in an untrusted environment and in a second mode in a trusted environment.

BACKGROUND

Digital rights management (DRM) enables the delivery of content from a source to a recipient, subject to restrictions defined by the source concerning use of the content. Exemplary DRM systems and control techniques are described in U.S. Pat. No. 7,073,199, issued Jul. 4, 2006, to Raley, and U.S. Pat. No. 6,233,684, issued May 15, 2001, to Stefik et al., which are both hereby incorporated by reference in their entireties. Various DRM systems or control techniques (such as those described therein) may be used with the obscuration techniques described herein.

One of the biggest challenges with controlling access and use of content is to prevent users from accessing the content in a manner other than those permitted by usage rights. As known in the art, usage rights indicate how content may be accessed or otherwise used. Usage rights may be embodied in any data file and/or defined using program code, and may further be associated with conditions that must be satisfied before access or other use of the content is permitted. Usage rights, which are also referred to as "usage rules" herein, may be supported by cohesive enforcement units, which are trusted devices that maintain one or more of physical, communications and behavioral integrity within a computing system.

For example, if the recipient is allowed to create an unauthorized (not DRM-protected) copy of the content, then the recipient's use of the copy would not be subject to any use restrictions that had been placed on the original content. When DRM systems impose restrictions on the use of a rendering device, for example, by preventing or impeding the use of the screen capture features, a conflict arises between the rendering device owner's (user, receiver, or recipient) interest in being able to operate their device with all of its features without restriction (including screen capture capability), and the content provider's (sender, or source) interest in regulating and preventing copying of the content rendered on the recipient's devices. This conflict has historically been overcome by establishing trust between the content supplier and the rendering device. By establishing trust in this manner, the content supplier can ensure that the rendering device will not bypass DRM restrictions on rendered content.

There is a field of technology devoted to trusted computing which balances control of the rendering device by the content provider with control by the recipient. In cases where the recipient operates a trusted client and the content provider (source) controls the trusted elements of the client, screen capture by the device (e.g., satellite DVRs, game consoles and the like) can be prevented by disabling those capabilities. However, users typically operate devices that are substantially under their control (e.g., PCs, Macs, mobile phones and the like), such that installation and execution of software may be initiated and/or controlled by a user.

U.S. Pat. No. 8,914,906 discloses a method and apparatus for identifying whether a rendering engine is secure and if not, for obtaining the requisite security components to render protected content.

BRIEF DESCRIPTION OF THE DRAWING

Embodiments are described herein in connection with the drawing, in which.

DETAILED DESCRIPTION

Figure 1:
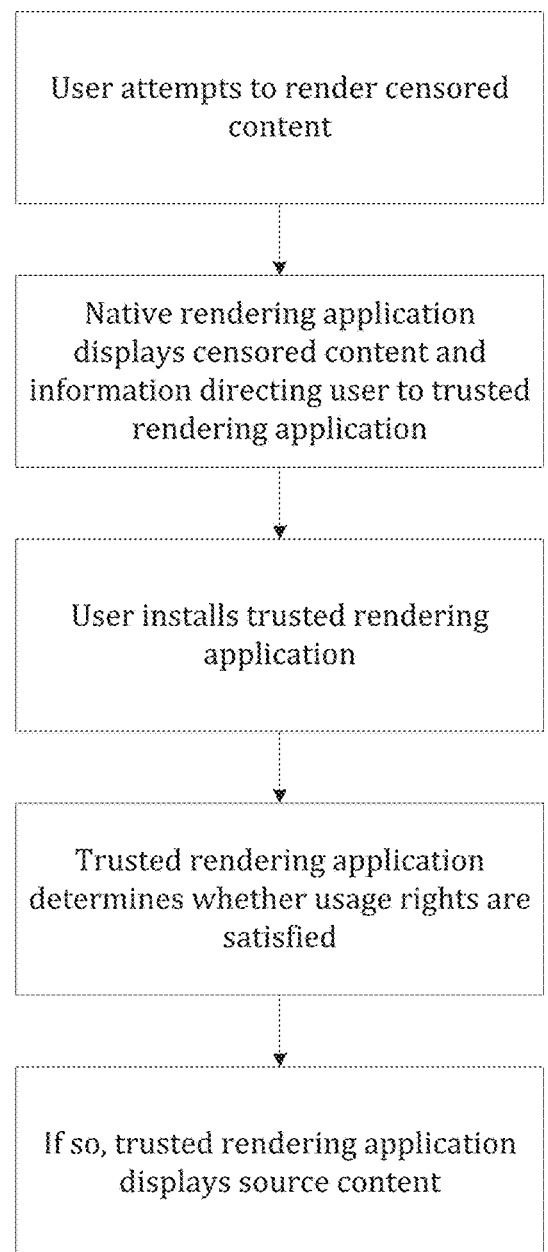
FIG. 1 is a flowchart of a method of rendering content.

This disclosure describes aspects of embodiments for carrying out the inventions described herein. Of course, many modifications and adaptations will be apparent to those skilled in the relevant arts in view of the following description in view of the accompanying drawings and the appended claims. While the aspects of the disclosed embodiments described herein are provided with a certain degree of specificity, the present technique may be implemented with either greater or lesser specificity, depending on the needs of the user. Further, some of the features of the disclosed embodiments may be used to obtain an advantage without the corresponding use of other features described in the following paragraphs. As such, the present description should be considered as merely illustrative of the principles of the present technique and not in limitation thereof.

The disclosed embodiments relate to content subject to digital rights management ("DRM") running on computing platforms. The exemplary embodiments significantly improve the content sender's ability to regulate use of content after the content is distributed.

For the sake of convenience, this application refers to unmodified (e.g., not obscured or censored) content sent by the sender's device as "source content." Source content may be encrypted, compressed and the like, and multiple copies of the source content (each copy also referred to as source content) may exist. In addition, content, as disclosed herein, refers to any type of digital content including, for example, image data, video data, audio data, textual data, documents, and the like. Digital content may be transferred, transmitted, or rendered through any suitable means, for example, as content files, streaming data, compressed files, etc., and may be persistent content, ephemeral content, or any other suitable type of content.

Ephemeral content, as used herein, refers to content that is used in an ephemeral manner, e.g., content that is available for use for a limited period of time. Use restrictions that are characteristic of ephemeral content may include, for example, limitations on the number of times the content can be used, limitations on the amount of time that the content is usable, specifications that a server can only send copies or licenses associated with the content during a time window, specifications that a server can only store the content during a time window, and the like.

Screen capture is a disruptive technology to ephemeral content systems. It allows the content to persist beyond the ephemeral period (e.g., it allows ephemeral content to become non-ephemeral content). SnapChat, for example, is a popular photo messaging app that uses content in an ephemeral manner. Specifically, using the SnapChat application, users can take photos, record videos, and add to them text and drawings, and send them to a controlled list of recipients. Users can set a time limit for how long recipients can view the received content (e.g., 1 to 10 seconds), after which the content will be hidden and deleted from the recipient's device. Additionally, the Snapchat servers follow distribution rules that control which users are allowed to receive or view the content, how many seconds the recipient is allowed to view the content, and what time period (days) the Snapchat servers are allowed to store and distribute the content, after which time Snapchat servers delete the content stored on the servers.

Aspects of the disclosed embodiments enable the use (including rendering) of DRM-protected content while frustrating unauthorized capture of the content (e.g., via screen capture), and while still allowing the user (recipient) to visually perceive or otherwise use the content in a satisfactory manner. This is particularly useful when the content is rendered by a DRM agent on a recipient's non-trusted computing platform. This may be achieved through the application of an obscuration technique (OT) that obscures part or all of the content when the content is rendered. With respect to ephemeral content, obscuration is an enabling technology for ephemeral content systems in that it thwarts a set of technologies that would circumvent the enforcement of ephemeral content systems. The techniques described herein have been proven through experimentation and testing, and test results have confirmed the advantages of the results.

An obscuration technique may be applied during creation of the content or at any phase of distribution, rendering or other use of the content. For example, the obscuration technique may be applied by the sender's device, by the recipient's device, by a third party device (such as a third party server or client device), or the like. When an obscuration technique (OT) is applied to content during its creation or distribution (e.g., by an intermediate server between the content provider and the end user), the resulting content may be referred to as "obscured content." When an obscuration technique is applied during the rendering of content the resulting rendering may be referred to as "obscured rendering" or the resulting rendered content as "obscurely rendered content." In addition, the application of an obscuration technique may include the application of more than one obscuration technique. For example, multiple obscurations may be applied during an obscured rendering, either simultaneously or using multi-pass techniques. Thus, the exemplary obscuration techniques described herein may be applied in combination, with the resulting aggregate also being referred to as an obscured rendering.

While aspects of the disclosed embodiments relate to the obscuration technique applied to source content, the obscuration techniques may instead be applied to content in general. For example, the obscuration may be applied to censored content or applied to the rendering of censored content. "Censored content," as used herein, refers to content that has been edited for distribution. Censored content may be created by intentionally distorting source content (or other content) such that, when the censored content is displayed, users would see a distorted version of the content regardless of whether a user is viewing an obscured rendering or an unobscured rendering of the censored content. Censored content may include, for example, blurred areas. The content may be censored using any suitable means, and censored content may be displayed using a trusted or non-trusted player.

Regarding obscured rendering, aspects of the disclosed embodiments take advantage of the differences between how computers render content, how the brain performs visual recognition, and how devices like cameras capture content rendered on a display. Embodiments of the invention apply obscuration techniques to a rendering of content in a manner that enables the content to be viewed by the user with fidelity and identifiability, but that degrades images created by unwanted attempts to capture the rendered content, e.g., via screen capture using a camera integrated into a device containing the display or using an external camera. As an example, identifiability may be quantified using the average probability of identifying an object in a rendering of content. The content may be degraded content, obscurely rendered content or source content. At one end of the identifiability score range would be the identifiability score of a rendering of the source content, whereas the other end of the range would be the identifiability score of a rendering of a uniform image, e.g., an image with all pixels having the same color. The uniform image would provide no ability to identify an object.

The identifiability score of the obscurely rendered content would fall between the scores of the degraded content and the source content, whereas the identifiability score of the degraded content would fall between the scores of the uniform image and the score of the obscurely rendered content. The average probability of identifying the object in content may be determined as an average over a sample of human users or over a sample of computer-scanned images using facial or other image recognition processes and the like. As an example for fidelity, fidelity may be quantified by comparing the perceived color of one or more regions in rendered degraded content with the perceived color of the one or more regions in the rendered original content, where deviations of the color may be measured using a distance metric in color space, e.g., CIE XYZ, Lab color space, etc. As another example regarding a fidelity metric see (http://live.ece.utexas.edu/research/quality/VIF.htm). The degraded images captured in this manner will have a significantly reduced degree of fidelity and identifiability relative to the human user's view of content as displayed in an obscured rendering or a non-obscured rendering. Embodiments of the invention also enable a scanning device, such as a bar code or QR code reader, to use the content in an acceptable manner, e.g., to identify the content being obscurely rendered, while degrading images created by unwanted attempts to capture the obscurely rendered content.

Computers often render content in frames. When an image is captured via a screen shot or with a camera operating at a typical exposure speed (e.g., approximating the frame rate for the display device, e.g., 20-120 Hz), a single frame of the obscurely rendered content may be captured, which will include whatever obscuration is displayed in that frame of the obscurely rendered content. Alternatively, a screen capture or the like may capture multiple frames depending on exposure speed, but embodiments of the invention nevertheless may apply obscuration techniques that cause images captured in this manner to be degraded such that the resulting images have a significantly reduced degree of fidelity and identifiability relative to a human user's perception (or scanning device's scanning and processing) of the obscurely rendered content. In contrast, for a human user, due to persistence of vision and the way the brain processes images, the user will be able to view or otherwise use the obscurely rendered content perceived over multiple frames with fidelity and identifiability.

Ideally, the user will perceive the obscurely rendered content as identical to an unobscured rendering of the content (whether source content, censored content, etc.). The human user may not always perceive the obscurely rendered content as a perfect replication of the unobscured rendering of content because application of the obscuration technique may create visual artifacts. Such artifacts may reduce the quality of the rendering of the content perceived in the obscured rendering, although not so much as to create an unacceptable user experience of the content. An unacceptable user experience may result if objects in the obscurely rendered content are unrecognizable or if the perceived color of a region in the obscurely rendered content deviates from the perceived color of the region in the rendered source content by a measure greater than what is typically accepted for color matching in various fields, e.g., photography, etc.

When considering which obscuration technique should be used, a content provider or sender may consider how the obscuration technique will affect the user's perception of the obscurely rendered content, and also the effect the obscuration technique will have on how degraded the content will appear in response to an attempt to copy of the content via, e.g., a screenshot. For example, a content provider may want to select an obscuration technique that minimizes the effect the obscuration technique will have on the user's perception of an obscured rendering of content, while also maximizing the negative effects the obscuration technique will have on the degraded content.

To determine how the obscuration technique will affect the display of the content, previews of the obscurely rendered content and the degraded content may be displayed to the user. For non-human scanning devices, the content provider or sender may conduct testing of the ability of the scanning device to use obscurely rendered content (e.g., to identify desired information from the obscurely rendered content) subject to varying parameters, e.g., spatial extent and rate of change of the obscuration.

Thus, in summary, when a content supplier wants to distribute source content, the content may be distributed in any form (source content, censored content, etc.). Embodiments of the invention may apply obscuration techniques that enable authorized/intended users or scanning devices to use the obscurely rendered content or the obscured content in a satisfactory manner, while causing unauthorized accesses of obscured renderings to result in degraded content.

To prevent unauthorized access to content, techniques may be used to improve the content sender's ability to regulate content that is to be rendered on a receiver's device. In some cases, these techniques can prevent the content from being perceptible to an authorized user of the content. For example, as described above, the content may be obscured, blurred, distorted, damaged, or otherwise made less useful to a user.

When a user attempts to render content in a trusted computing environment, for example, using a trusted rendering application, the user may be allowed to access the content, which may be obscured content via an obscured rendering. In these cases, the trusted computing environment can be trusted with access to the content because it is part an ecosystem. Members of the ecosystem have been developed to enforce restrictions on the content (e.g., a DRM client can be part of a trusted computing ecosystem. The ecosystem can be bounded by those clients that can be trusted to follow usage rules associated with content and access to content encryption keys for that content). Content ecosystems today have a rich ability to move content freely across ecosystems. As an example, Facebook can post YouTube videos, email attachments (e.g., images) can be posted on websites, etc. One obstacle to wide deployment of protected content across ecosystems (e.g., with unprotected content in the examples above) is that the protected content needs to be displayed and transported by a variety of systems, including systems that are not a part of the trusted ecosystem for a given piece of protected content (e.g., how can a DRM protected image be displayed on Facebook page). One approach is to have the rendering agent for the website become part of the trusted ecosystem (e.g., have the Facebook page that is sent to a client browser include a jpg rendering routine that is trusted to enforce usage rules associated with the content). An alternative is to use a rendering engine of the browser platform to render the protected content by wrapping it with a DRM agent. The use of exemplary DRM agents are described in U.S. Pat. No. 7,743,259, issued Jun. 22, 2010, and various DRM system and controls techniques (such as those described therein) may be used with the techniques described herein.

Aspects of the embodiments relate to the display of a censored version of the protected content in a non-trusted ecosystem as a proxy for the protected content. The censored version of the content is included in a "wrapper" that is structured in a way that can be rendered by non-trusted applications and also contains information allowing a client of trusted ecosystem to retrieve render the protected content. This multi-mode content is versatile and can be processed, distributed, and rendered by both trusted and non-trusted systems alike. The term "wrapper", is used herein in a customary manner and refers to data in a format for which there are a large number of widely deployed standard rendering engines (e.g. html, jpg, doc, pdf etc.) for displaying content and which contains information that can be interpreted by a "trusted" application to display additional content related to the content. The term "trusted" as used herein refers to an element that has been designed to operate within a designated content ecosystem and does not require any specific level of security or tamper resistance. For example, a "trusted rendering engine" is a rendering engine that renders content in a manner that is different than standard rendering engines and which is designed to operate within a content ecosystem.

However, when a user attempts to render content while operating a non-trusted or unprotected computing environment, controls may be needed to prevent unauthorized access or other use. For example, the content may be obscured or censored as described above. Some aspects of the disclosed embodiments allow an authorized user to access or otherwise use obscured or censored content even when the user attempts to render the content within a non-trusted computing environment, for example, by installing a trusted rendering application within the non-trusted computing environment.

As shown in FIG. 1, when a receiver's device receives a wrapper, aspects of the embodiments allow the receiver's device, if it is a trusted renderer of the ecosystem for the protected content, to render the associated source content or obscured content. In other circumstances, it is desirable for an authorized user to instead be able to render only the censored content because the user is operating a non-trusted or unprotected computing environment. This can be accomplished through the use of wrappers that can be distributed to the receiver's device.

A wrapper may be a data structure that can be used to control access to content. The data structure may be stored in a memory of a computing device that is displaying the content, for example. When changes are made to the wrapper (e.g., when the wrapper is being prepared or modified), a data structure within the wrapper is manipulated or transformed, and the modified data structure may again be stored within a memory of a computing device.

The wrapper can be configured such that, when a non-trusted rendering application opens the wrapper, the non-trusted rendering application will display information included in the wrapper that identifies source content that may be made available to the user and steps that the user can take to render the source content. In addition, the wrapper may be further configured such that, when a trusted rendering application opens the wrapper, the source content may be displayed or accessed by the user. A wrapper may include containers or packages that may include data, such as the content (e.g., censored content, source content, etc.), usage rules, obscuration technique program code, and the like.

An example of a wrapper is a jpg image that concatenates an xml portion at the end of the jpg image file, which end is ordinarily indicated by the end bytes 0xFF and 0xD9. The concatenated portion will not be read by standard jpg viewers instead they will show the normal jpg file at the start of the file (censored content) and stop reading the rest of the file after the end bytes. A trusted rendering engine could load the same .jpg file and look for the material that is concatenated at the end of the document to display a different image (source content). The source content could be a sharp image. The censored content could be a censored and/or obscured version of the image with instructions for retrieving the source content. The information could be text saying "open this image in 'new application' and see the sharp version, a URL to download the trusted rendering application, or the like.

Generally speaking, a receiver's device first receives, downloads, or otherwise obtains censored content, or other content identifying the source content, that is designed to be rendered within both a trusted rendering application and a non-trusted rendering application alike. When the receiver's device attempts to render the censored content, the receiver's device opens the censored content as contained in a wrapper in a rendering application installed on the receiver's device (e.g., a native rendering application). If a suitable rendering application is not installed on the receiver's device, the rendering application may be received, downloaded, or otherwise obtained.

If the rendering application is not a trusted rendering application, the censored content may be displayed within the rendering application, and may include information instructing the receiver how to obtain a trusted rendering application so that the source content may be rendered. In addition, a portion of the source content may be displayed to the receiver as well, for example, as a teaser. In this manner, the wrapper functions to inform the receiver how to access the source content when the receiver's device does not open the package including the censored content with a trusted rendering application or player.

Using the information regarding the trusted rendering application, the receiver's device can obtain and install the trusted rendering application on the receiver's device. In this regard, the wrapper may also include information that demonstrates to the receiver's device that the sender's device is trustworthy. This information may also be used to establish trust between the receiver's device and the sender's device. This information may include, for example, an image associated with the sender's device, an identifying logo or mark that represents the sender or any associated entities, an image or other information associated with a location representing the sender's device or the source content, and the like. This trust information is also formatted in such a way as to be renderable in either trusted or non-trusted applications alike.

After the trusted rendering application is installed, the receiver's device can again attempt to render the wrapper containing the censored content using the trusted rendering application, and the trusted rendering application can make a determination regarding whether the rendering of the source content is permitted by one or more usage rights associated with the content. If the rendering is permitted, the trusted rendering application can allow the receiver's device to render the source content associated with the censored content using the trusted rendering application. While aspects of this disclosure describe that a trusted rendering application can render the source content, the source content may instead be displayed as obscured content to prevent unauthorized use of the source content, for example, by screen capture.

In some embodiments, the wrapper package can be stored as a DRM file, and the wrapper can point to a DRM enabled application. The DRM enabled application can reference the DRM file and render the content in accordance with the DRM controls.

Figure 2:
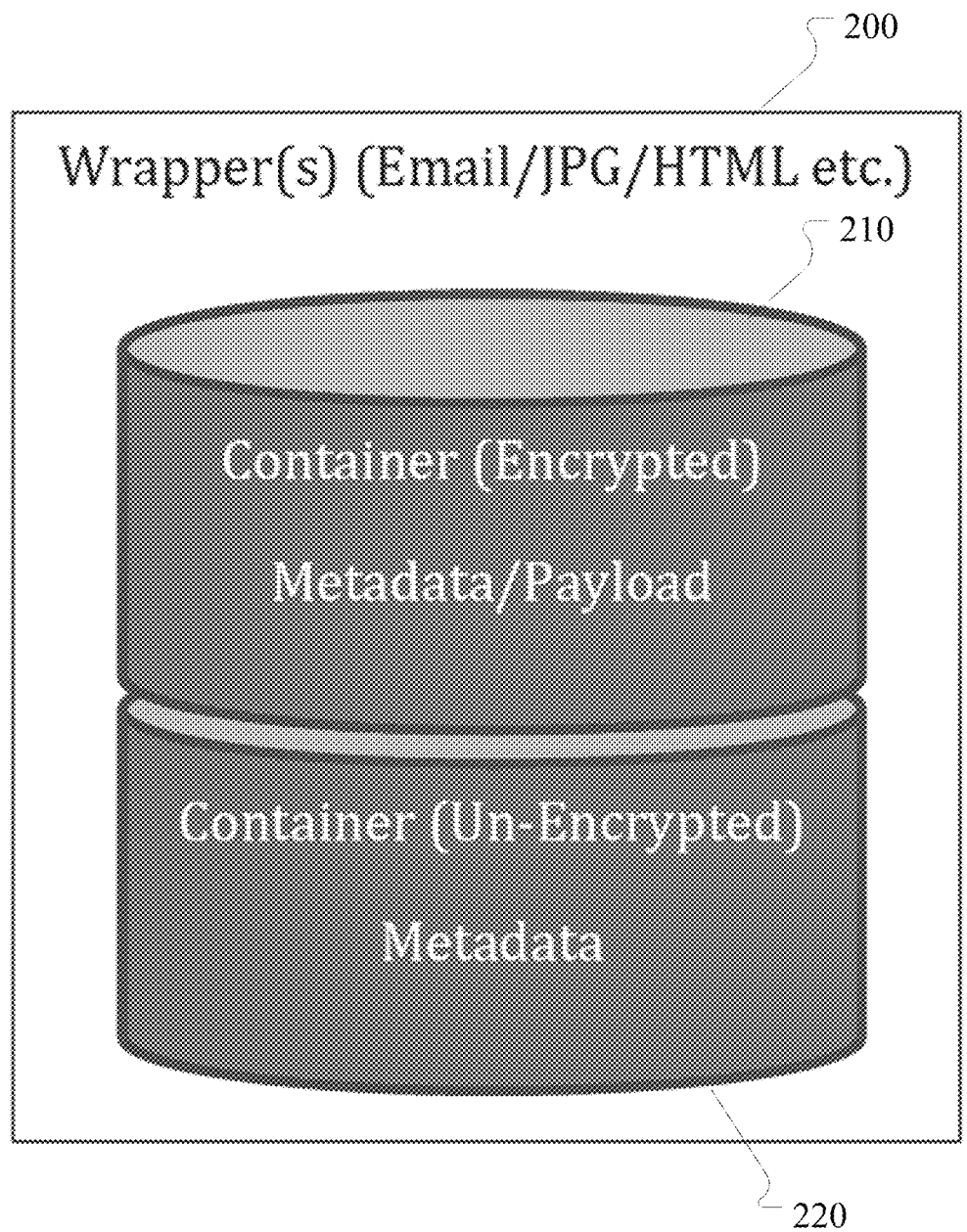
FIG. 2 is a schematic illustration of a wrapper data structure.

As shown in FIG. 2, the data structure of wrapper 200, which can be distributed in a package with content, may include an encrypted container portion 210 and an unencrypted container portion 220.

The encrypted container portion 210 of a distribution package or wrapper package data structure may be encrypted through any known means, for example, such that only valid trusted components of a receiver's device or distribution system can access its contents. In addition, the encrypted section may include information to enable a trusted rendering application to retrieve keys necessary to decrypt content stored within the encrypted container portion if the content is encrypted. For example, if the encrypted container portion includes encrypted source content, keys may be used to decrypt the source content. The keys used for decryption of the encrypted container portion and/or any encrypted content included therein may be any type of suitable key, for example, a symmetric key used to encrypt the content. In addition, techniques for encryption and decryption may include public key infrastructure (PKI), a symmetric key being used to encrypt the package, encryption using a public key of each principal, and the like. Pointers may also be included that point to a server where the keys can be retrieved or point to a server that has a rolling or dynamic secret. Alternatively, the encrypted portion may contain a pointer to where the encrypted content can be retrieved.

The encrypted section may further include usage rights that are to be enforced by the trusted rendering application using a rights language. These rights may apply to all types of content (source content, censored content, etc.) stored in the package. The usage rights may specify a Principal (who has the rights), a Resource (the package or content to which the rights are assigned), Rights (how the packaged content may be used), and Conditions (under what limitations can the rights be exercised). For example, a Principal may be defined to include everyone, anyone having a password, a user with a specific UserID (e.g., Email address, name, etc.), anyone in a group with a specific GroupID (e.g., Email address, group name, etc.), and the like. The Resource may be defined by a GUID or other identifier of the content, information specified by usage rights, usage rights that are updated after initial distribution of the content, and the like. The Rights may include any usage rights including, for example, Display, Extract (e.g., recover content that is included in the package), Print, Forward (e.g., a right to add another Principal and transfer the content to that Principal, etc.), and the like. The Conditions may include any conditions including, for example, Time Window (to first open), Time Window (to use), GPS perimeter (50 miles from identified city center), Accounting Real-time connection required (phone call to owner during playback), and the like. The encrypted section may also include instructions indicating how a receiver may obtain or acquire additional rights.

The encrypted container portion of the package may also include a payload that may be used to store the content. This payload may support multiple files and file types, and may include multiple versions of the content (e.g., source content, obscured content, censored content, etc.). In addition, the payload can be a single self-contained file that can be unpacked by the trusted rendering application and used to recover multiple files. The package may be agnostic of file type for the payload files. The payload may also support compression formats to store content and other files in an efficient manner, and support file types for any platform or operating system including, for example, IOS, Android, PC, Mac, or Linux. The payload may also contain a GUID generated at time of packaging, and be encrypted with a secret generated at time of packaging. This secret can be used to decrypt the source content as described above if the source content is encrypted.

In addition, during preparation of the wrapper package, a hash of the package may be calculated. The hash in turn may be signed by a private key associated with sender's device or another device that prepares the wrapper package, and may allow the player application and other services to validate that the trafficked package is a genuine package.

The unencrypted container portion of the wrapper package data structure may include metadata that non-trusted components can use to help manage the content package's lifecycle. This section of the package may include, for example, a unique package GUID (different from or the same as the GUID stored in the Payload), a workflow or application identifier: "Forward Lock"; "Package Tracking"; "Screen Send" etc., information identifying the package version and any copyright information, and information needed to download or otherwise obtain a trusted rendering application, such as a URL for downloading the application.

The censored content or a sample of the source content (e.g., a teaser version of the source content) may also be included in the unencrypted section.

The wrapper package data structure can be distributed or otherwise be made available in any suitable form. For example, as described herein, the wrapper package data structure may be transmitted via email, may be encoded and embedded in an HTML document, may be distributed within an image, and the like. Any suitable packaging can be used.

The wrapper package data structure can be distributed via email. When this method is used, the email itself can function as the wrapper, and the unencrypted and encrypted containers may be attached to the email. The combination of an email with the attached containers can be referred to as an email package. The email portion of the package can serve a function in addition to a method for transmitting the containers. For example, the email portion of the package may include an embedded rendering of the content, for example, the censored content or the obscured content.

The wrapper package data structure can also be distributed as an HTML document, or within an existing HTML document. When this method is used, the HTML document becomes the wrapper, and the unencrypted and encrypted containers can be embedded into the HTML document. The wrapper may include instructions (e.g., in HTML) for how a receiver's device can retrieve a trusted rendering application. Additionally, the wrapper may include use HTML program code to render the content, for example, the censored content or the obscured content.

The wrapper package data structure may also be distributed as an image file (e.g., .jpg, etc.), or within an existing image file. When this method is used, the image file becomes the wrapper, and the unencrypted and encrypted containers may be embedded into the image file using program code. The image file itself, when rendered, may cause the content to be rendered, for example, the censored content or the obscured content. This type of wrapper package may be configured in three different ways: post-pended, metadata/non-displayed, and displayable.

Post-Pended: In this case, the containers can be binary code added to the end of the image file. Most image viewers will load the file and find the beginning of the image codec at the start of the image file. When the image viewer reaches the end of the codec, the remainder of the image file may be ignored by the image viewer (See, for example, http://lifehacker.com/282119/hide-files-inside-of-jpeg-images). Thus, the wrapper packages, including the containers, may be included in the image file after the codec portion.

Metadata/Non-Displayed: In this case, the wrapper package can be stored within the image file as non-displayable elements that are not used during rendering of the image file.

Displayable Data: In this case, the wrapper package can be encoded into an image file as a valid sequence of displayable data (lossless). This "displayed" version of the wrapper package may include any sort of image data, for example, a chaotic image with a valid image border, and the like. The remainder of the displayed image may include instructions for downloading a trusted rendering application, authentication imagery (e.g., image elements that may be used to authenticate the content, wrapper package, content sender, and the like), an explanation that the displayed image is a protected file that can only be viewed by the trusted rendering application, and the like Aspects of the embodiments relate to controlling content distributed using social networks. For example, when a sender's device posts source content (e.g., a video, an image, or other content) to a social network, the user may not want everyone on the social network to be able to see the content. Instead, the sender may want to maintain control over the use of the source content. By packaging the source content into a wrapper package data structure as described herein, when a user attempts to view the source content, the source content is not displayed in the native social network application. Instead, censored content may be displayed, and a link may be provided to install a trusted rendering application that can render, for example, an obscured rendering of the uncensored, source content.

Figure 3:
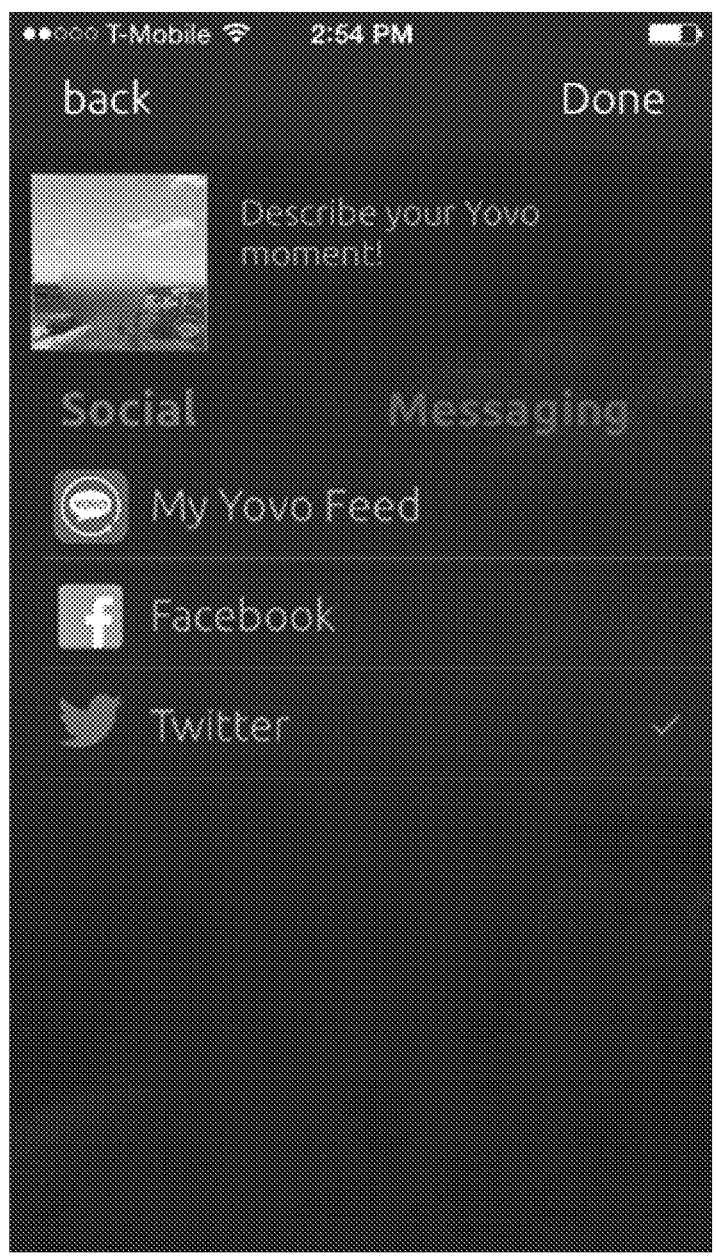
FIG. 3 is an example of censored content as rendered.
Figure 4:
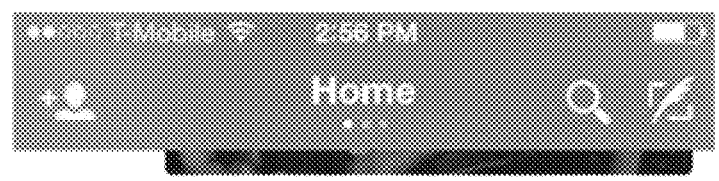
FIG. 4 is an example of censored content and a location identifier for corresponding source content.
Figure 5:
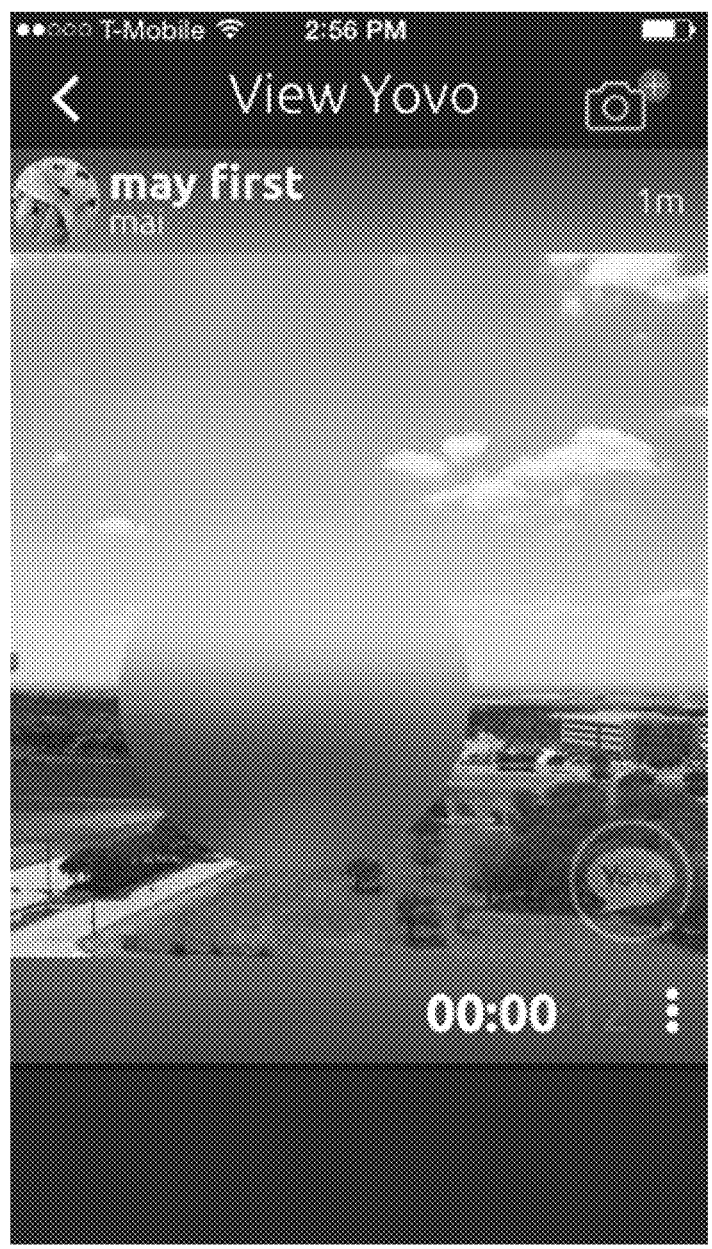
FIG. 5 is an example of a display of censored content as viewed by a non-trusted application.

As an example, as shown in FIG. 3, the sending application can create a wrapper data structure as a Tweet in Twitter. As shown in FIG. 4, the Tweet would contain a censored content as an image (e.g., a blurry version of a picture instead of the picture as an unencrypted image) and a location identifier (e.g., url) to a server where the encrypted payload can be retrieved. In addition, text would be added to the Tweet saying "log into Twitter with YOVO and open this Tweet to see the real thing!". FIG. 5 shows a display of the censored content as viewed by a non-trusted application, for example.

Figure 6:
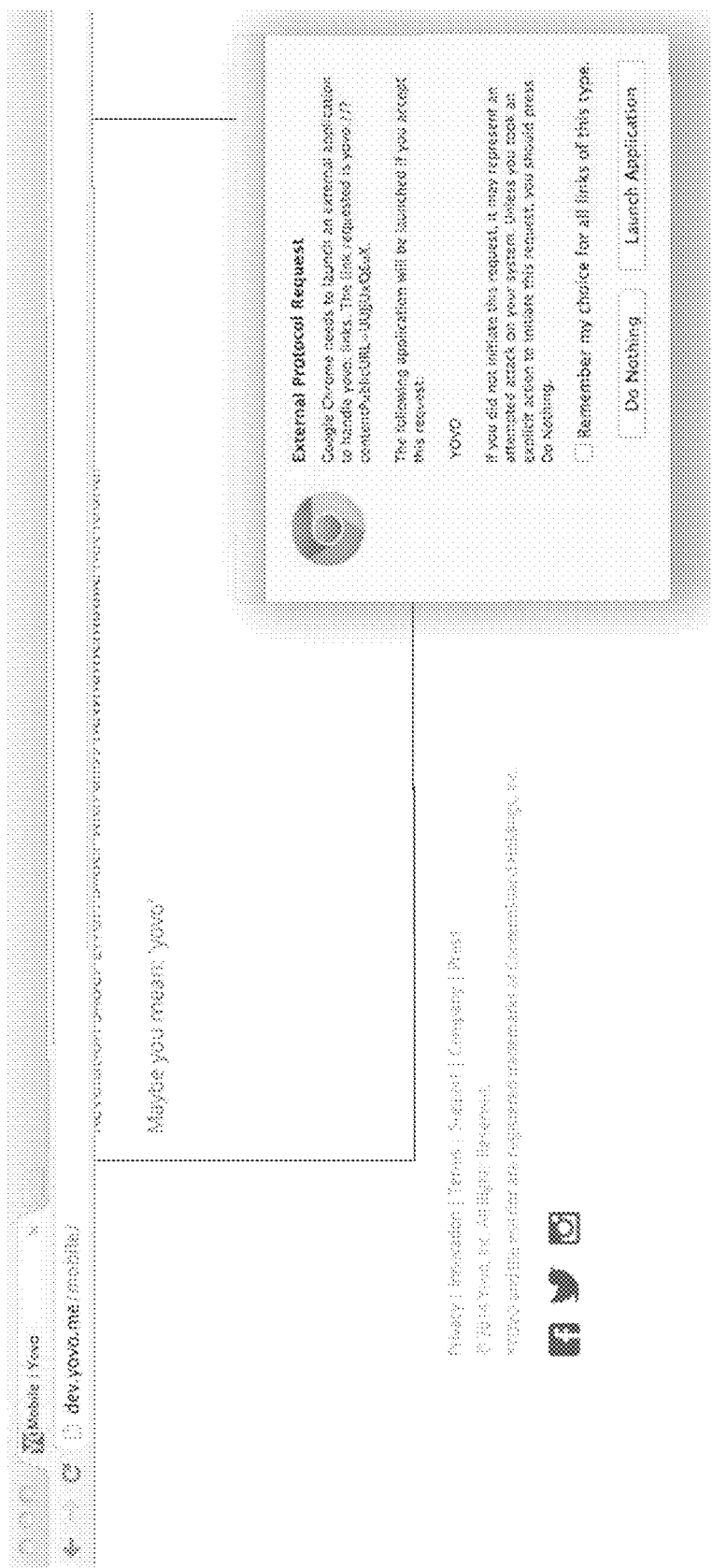
FIG. 6 is an example of a display of a location identifier that may be used to locate source content.

This combination of information (e.g., censored data, encrypted data reference, instructions to user, etc.), may all be formatted within the wrapper package to be opened by any Twitter client. The resulting wrapper (e.g., a Tweet wrapper) is distributable and renderable by non-trusted Twitter servers and Twitter clients. However, when rendered by a trusted Twitter client, the location identifier may be used to locate the source image (See FIG. 6), and a Tweet may be displayed showing the source image instead of the censored image as untrusted Twitter clients would. Additionally, a trusted Twitter client can understand any usage rules associated with the source image and enforce those usage rules (e.g., ephemerality, recipient's authentication, obscured rendering, and the like) using traditional DRM techniques (such as those described in U.S. Pat. No. 7,743, 259, issued Jun. 22, 2010, entitled "System and method for digital rights management using a standard rendering engine") used when the trusted client follows the URL to retrieve the encrypted container using the URL in the Tweet. For example, non-trusted Twitter clients would simply show a URL in the Tweet, while a trusted rendering application would understand what is required based on the formatting of the Tweet (e.g., if there is a URL, check to see if it points to a server that is known to be part of a trusted ecosystem, then use the URL to retrieve the DRM protected content using well known DRM client server technologies and the URL as an identifier for which content).

Furthermore, by utilizing facial recognition software, for example, specific aspects of the source content (e.g., faces, location information, etc.) can be concealed or censored until the content is rendered using the trusted rendering application.

The obscuration techniques described herein can be applied to content in a variety of ways. In some embodiments, the following process may be used. First, an image layer can be created for the obscured rendering. This image layer may include the source content (or any other content to be displayed). If a masking obscuration technique is being used, a mask layer can also be created, which may accept user interface elements. This layer can be overlaid over the image layer in the display. The mask layer can be any suitable shape, for example, a circle, a square, a rounded corner square, and the like. During rendering, the mask layer should not prevent the image layer from being viewed unless there are obscuration elements within the mask layer that obscure portions of the image layer. In some embodiments, the mask layer can be configured by a content owner or supplier through any suitable input method, for example, by touching, resizing, reshaping, and the like. Then, one or more sequence of images can be created from the source content, and each image in each sequence can be a transformation of the source content. When the sequences of images are viewed sequentially, for example, at the refresh rate of the display screen or a rate that is less than the refresh rate of the display screen (e.g. every other refresh of the screen, etc.), the displayed result of the sequences of the images approximates the original source image. In some embodiments, multiple sequences of image frames (e.g. 2-100 or more in a sequence) can be generated, and more than one type of transformation technique may be used. The image frames from one or more of the sequences can then be rendered at a rate that can be approximately the refresh rate of the display screen (e.g. 15-240 Hz). In some embodiments, the user can select which sequence of image frames to display (e.g. sequence 1, sequence 2, etc.).

The mask layer can then be used to overlay the rendered sequence over the image layer, which creates a background of the source image via the image layer with the mask layer selecting where to show the sequence of transformed image frames. In some embodiments, the user can manipulate the mask layer while also previewing different sequences of image frames, and the user can also select a combination of a mask shape and/or form with a selection of a sequence. The resulting selections can be stored, associated with the source content, and distributed with the source content.

The source content and the selected mask and sequence(s) can then be transmitted to a receiving device. When the receiving device renders the source content, the selected mask and the selected sequence of image frames can be used to render the content obscurely.

When obscuration techniques are applied to still images according to some embodiments, the obscuration techniques frames in a frame set may be converted to GIF frames, for example. These GIF frames then can be saved in animated GIF file format for playback as an n-frame loop.

Another approach takes advantage of computing devices with graphic processors (GPUs) and multiple frame buffers. A frame buffer consists of a large block of RAM or VRAM memory used to store frames for manipulation and rendering by the GPU driving the device's display. For GPUs supporting double buffering with page flipping, and for still image obscuration techniques with a two-frame cycle, some embodiments may load each obscuration techniques frame into separate VRAM frame buffers. Then each buffer may be rendered in series on the device's display at a given frame rate for a given duration. For GPUs supporting triple buffering, and for still image obscuration techniques with a two-frame cycle, in some embodiments, each obscuration technique frame may be loaded into separate RAM back buffers. Then each RAM back buffer may be copied one after the other to the VRAM front buffer and rendered on the device's display at a given frame rate for a given duration.

Exemplary Computing Environment

Figure 7:
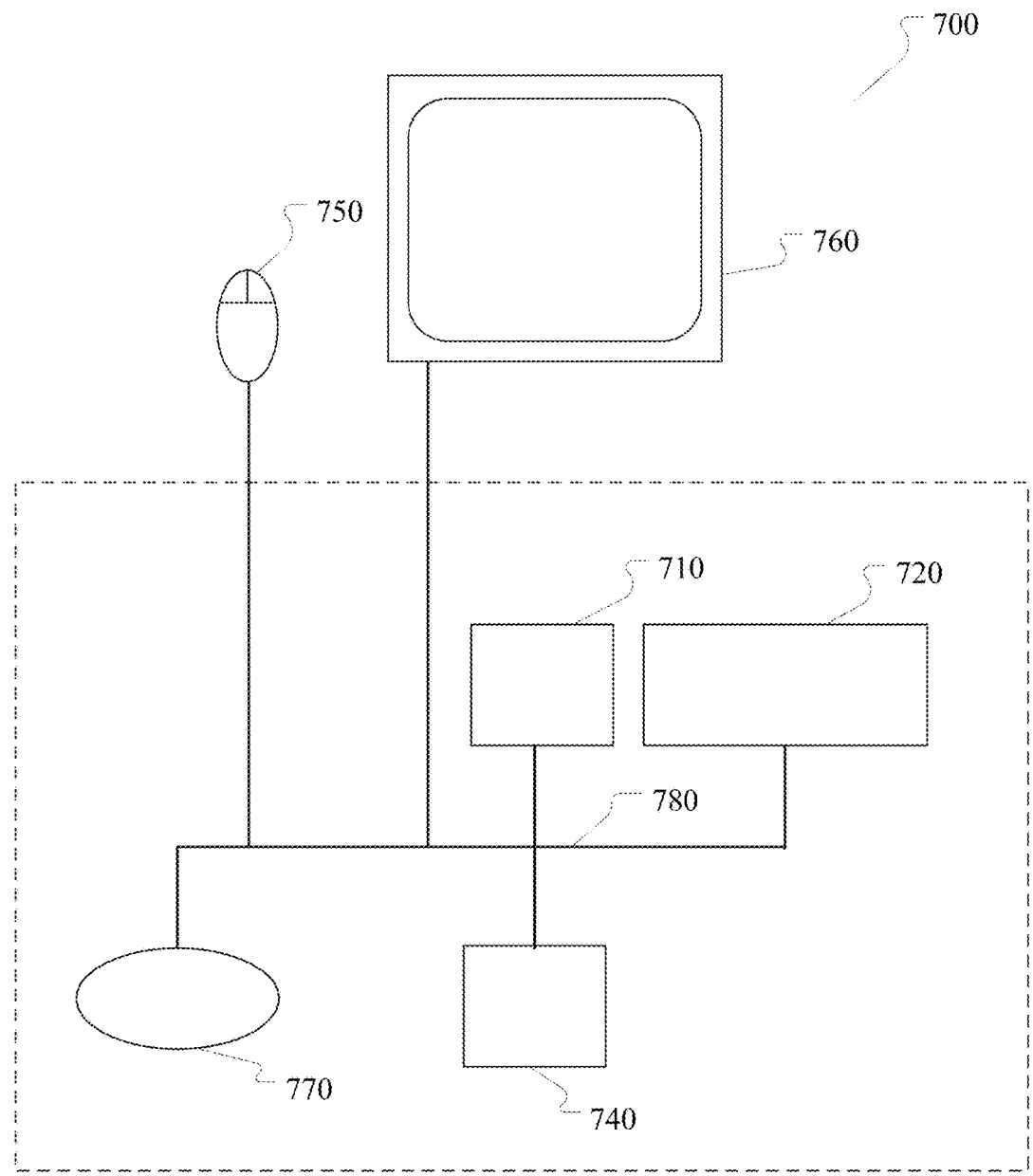
FIG. 7 is a schematic illustration of a computing device on which the embodiments can be used.

One or more of the above-described techniques can be implemented in or involve one or more computer systems. FIG. 7 illustrates a generalized example of a computing environment 700 that may be employed in implementing the embodiments of the invention. The computing environment 700 is not intended to suggest any limitation as to scope of use or functionality of described embodiments.

With reference to FIG. 7, the computing environment 700 includes at least one processing unit 710 and memory 720. The processing unit 710 executes computer-executable instructions and may be a real or a virtual processor. The processing unit 710 may include one or more of: a single-core CPU (central processing unit), a multi-core CPU, a single-core GPU (graphics processing unit), a multi-core GPU, a single-core APU (accelerated processing unit, combining CPU and GPU features) or a multi-core APU. When implementing embodiments of the invention using a multi-processing system, multiple processing units can execute computer-executable instructions to increase processing power. The memory 720 may be volatile memory (e.g., registers, cache, RAM, VRAM), non-volatile memory (e.g., ROM, EEPROM, flash memory, etc.), or some combination of the two. In some embodiments, the memory 720 stores software instructions implementing the techniques described herein. The memory 720 may also store data operated upon or modified by the techniques described herein A computing environment may have additional features. For example, the computing environment 700 includes storage 740, one or more input devices 750, one or more output devices 760, and one or more communication connections 770. An interconnection mechanism 780, such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and may include magnetic disks, magnetic tapes or cassettes, CD-ROMs, CD-RWs, DVDs, or any other medium which can be used to store information and which can be accessed within the computing environment 700. In some embodiments, the storage 740 stores instructions for software.

The input device(s) 750 may be a touch input device such as a keyboard, mouse, pen, trackball, touch screen, or game controller, a voice input device, a scanning device, a digital camera, or another device that provides input to the computing environment 700. The input device 750 may also be incorporated into output device 760, e.g., as a touch screen. The output device(s) 760 may be a display, printer, speaker, or another device that provides output from the computing environment 700.

The communication connection(s) 770 enable communication with another computing entity. Communication may employ wired or wireless techniques implemented with an electrical, optical, RF, infrared, acoustic, or other carrier.

Implementations can be described in the general context of computer-readable media. Computer-readable media are any available storage media that can be accessed within a computing environment. By way of example, and not limitation, within the computing environment 700, computer-readable media may include memory 720 or storage 740.

Figure 8:
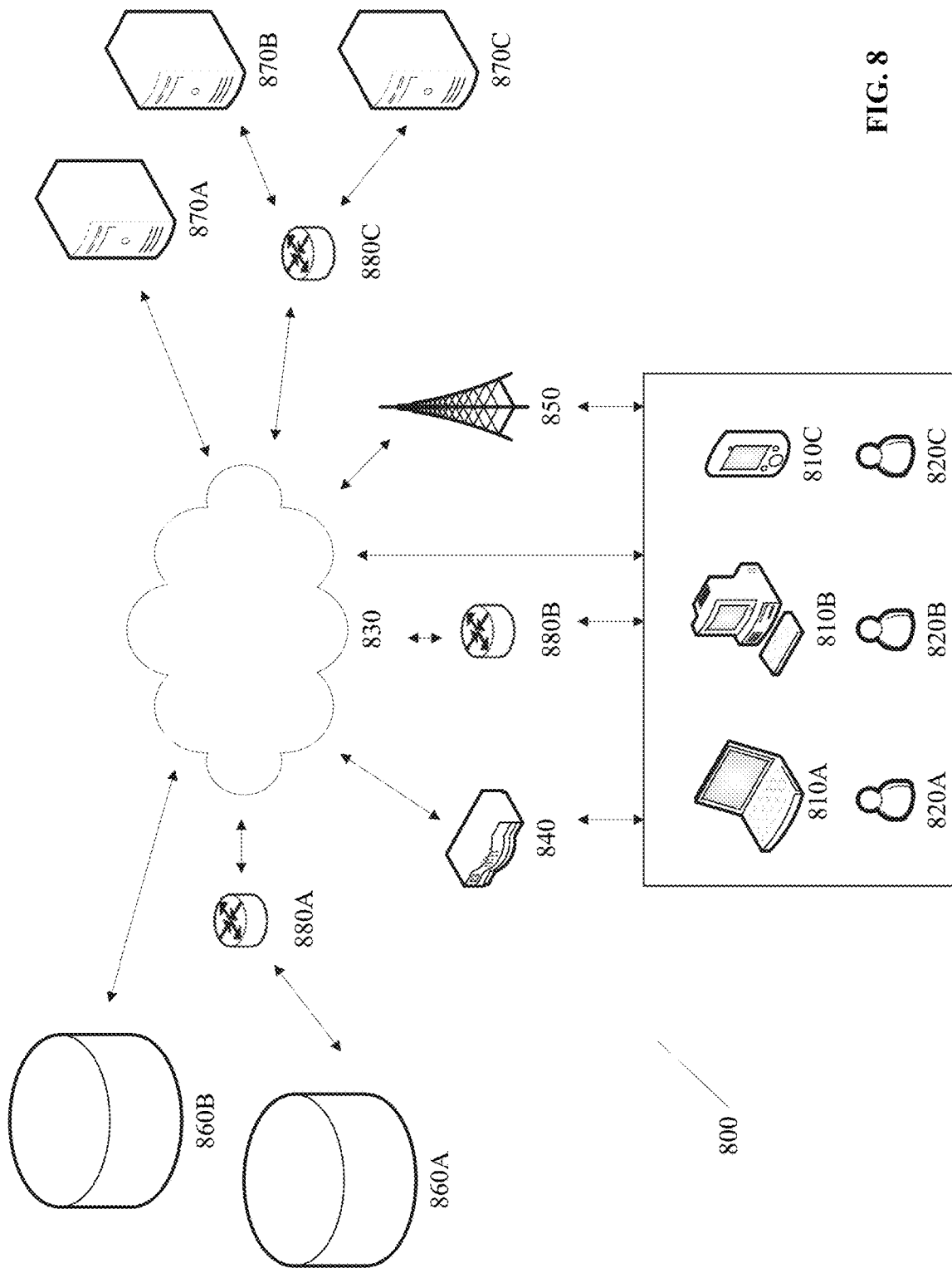
FIG. 8 is a schematic illustration of a network architecture on which the embodiments can be used.

One or more of the above-described techniques can be implemented in or involve one or more computer networks. FIG. 8 illustrates a generalized example of a network environment 800 with the arrows indicating possible directions of data flow. The network environment 800 is not intended to suggest any limitation as to scope of use or functionality of described embodiments, and any suitable network environment may be utilized during implementation of the described embodiments or their equivalents.

With reference to FIG. 8, the network environment 800 includes one or more client computing devices, such as laptop 810A, desktop computing device 810B, and mobile device 810C. Each of the client computing devices can be operated by a user, such as users 820A, 820B, and 820C. Any type of client computing device may be included.

The network environment 800 can include one or more server computing devices, such as 870A, 870B, and 870C. The server computing devices can be traditional servers or may be implemented using any suitable computing device. In some scenarios, one or more client computing devices may functions as server computing devices.

Network 830 can be a wireless network, local area network, or wide area network, such as the internet. The client computing devices and server computing devices can be connected to the network 830 through a physical connection or through a wireless connection, such as via a wireless router 840 or through a cellular or mobile connection 850. Any suitable network connections may be used.

One or more storage devices can also be connected to the network, such as storage devices 860A and 860B. The storage devices may be server-side or client-side, and may be configured as needed during implementation of the disclosed embodiments. Furthermore, the storage devices may be integral with or otherwise in communication with the one or more of the client computing devices or server computing devices. Furthermore, the network environment 800 can include one or more switches or routers disposed between the other components, such as 880A, 880B, and 880C.

In addition to the devices described herein, network 830 can include any number of software, hardware, computing, and network components. Additionally, each of the client computing devices, 810, 820, and 830, storage devices 860A and 860B, and server computing devices 870A, 870B, and 870C can in turn include any number of software, hardware, computing, and network components. These components can include, for example, operating systems, applications, network interfaces, input and output interfaces, processors, controllers, memories for storing instructions, memories for storing data, and the like.

Having described and illustrated the principles of the invention with reference to described embodiments, it will be recognized that the described embodiments can be modified in arrangement and detail without departing from such principles. It should be understood that the aspects of the embodiments described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa, where appropriate and as understood by those skilled in the art.

As will be appreciated by those of ordinary skilled in the art, the foregoing examples of systems, apparatus and methods may be implemented by suitable program code on a processor-based system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such program code, as will be appreciated by those of ordinary skilled in the art, may be stored or adapted for storage in one or more non-transitory, tangible machine readable media, such as on memory chips, local or remote hard disks, optical disks or other media, which may be accessed by a processor-based system to execute the stored program code.

The description herein is presented to enable a person of ordinary skill in the art to make and use the invention.

Various modifications to the disclosed embodiments will be readily apparent to those skilled in the art and the generic principles of the disclosed embodiments may be applied to other embodiments, and some features of the disclosed embodiments may be used without the corresponding use of other features. Accordingly, the embodiments described herein should not be limited as disclosed, but should instead be accorded the widest scope consistent with the principles and features described herein.

What is claimed is:

1. A method executed by one or more computing devices, the method comprising:
   receiving, by at least one computing device in the one or more computing devices, a wrapper, the wrapper including at least one censored content data structure in a format that is renderable by a standard rendering engine and containing censored content comprising source content identification information which identifies one or more source contents corresponding to the censored content;
   opening the wrapper by a rendering engine of the at least one computing device;
   rendering the censored content if the rendering engine of the at least one computing device is the standard rendering engine; and
   rendering the one or more source contents if the rendering engine of the at least one computing device is a trusted rendering engine;
   wherein the at least one censored content data structure includes the censored content in a first portion, data indicating an end of file in a second portion, and information corresponding to at least one of the one or more source contents in a third portion, wherein the standard rendering engine reads the first portion before the second portion and stops reading data after reading the data indicating an end of file in the second portion.

2. The method of claim 1, wherein the censored content includes instructions to access the trusted rendering engine.

3. The method of claim 2, wherein the instructions include a URL which provides access to the trusted rendering engine.

4. The method of claim 2, wherein the at least one censored content data structure includes encrypted information used to retrieve at least one of the one or more source contents for rendering.

5. The method of claim 1, wherein the wrapper is a JPEG file.

6. The method of claim 4, wherein the censored content includes a still image and instructions for accessing the trusted rendering engine and wherein the at least one of the one or more source contents is video content.

7. The method of claim 4, wherein the censored content includes an obscured version of at least one of the one or more source contents and instructions for accessing the trusted rendering engine and wherein at least one of the one or more source contents is video content.

8. An apparatus comprising:
   one or more processors; and
   one or more memories operatively coupled to at least one of the one or more processors and having instructions stored thereon that, when executed by at least one of the one or more processors, cause at least one of the one or more processors to:
      receive a wrapper, the wrapper including at least one censored content data structure in a format that is renderable by a standard rendering engine and containing censored content comprising source content identification information which identifies one or more source contents corresponding to the censored content;
      open the wrapper with a rendering engine of the apparatus;
      render the censored content if the rendering engine of the apparatus is the standard rendering engine; and
      render the one or more source contents if the rendering engine of apparatus is a trusted rendering engine;
   wherein the at least one censored content data structure includes the censored content in a first portion, data indicating an end of file in a second portion, and information corresponding to at least one of the one or more source contents in a third portion, wherein the standard rendering engine reads the first portion before the second portion and stops reading data after reading the data indicating an end of file in the second portion.

9. The apparatus of claim 8, wherein the censored content includes instructions to access the trusted rendering engine.

10. The apparatus of claim 9, wherein the instructions include a URL which provides access to the trusted rendering engine.

11. The apparatus of claim 9, wherein the at least one censored content data structure includes encrypted information used to retrieve at least one of the one or more source contents for rendering.

12. The apparatus of claim 8, wherein the wrapper is a JPEG file.

13. The apparatus of claim 11, wherein the censored content includes a still image and instructions for accessing the trusted rendering engine and wherein the at least one of the one or more source contents is video content.

14. The apparatus of claim 11, wherein the censored content includes an obscured version of at least one of the one or more source contents and instructions for accessing the trusted rendering engine and wherein at least one of the one or more source contents is video content.

15. At least one non-transitory computer-readable medium storing computer-readable instructions that, when executed by one or more computing devices, cause at least one computing device in the one or more computing devices to:
   receive a wrapper, the wrapper including at least one censored content data structure in a format that is renderable by a standard rendering engine and containing censored content comprising source content identification information which identifies one or more source contents corresponding to the censored content;
   open the wrapper with a rendering engine of the at least one computing device;
   rendering the censored content if the rendering engine of the at least one computing device is the standard rendering engine; and
   rendering the one or more source contents if the rendering engine of the at least one computing device is a trusted rendering engine;
   wherein the at least one censored content data structure includes the censored content in a first portion, data indicating an end of file in a second portion, and information corresponding to at least one of the one or more source contents in a third portion, wherein the standard rendering engine reads the first portion before the second portion and stops reading data after reading the data indicating an end of file in the second portion.

16. The at least one non-transitory computer-readable medium of claim 15, wherein the censored content includes instructions to access the trusted rendering engine.

17. The at least one non-transitory computer-readable medium of claim 16, wherein the instructions include a URL which provides access to the trusted rendering engine.

18. The at least one non-transitory computer-readable medium of claim 16, wherein the at least one censored content data structure includes encrypted information used to retrieve at least one of the one or more source contents for rendering.

19. The at least one non-transitory computer-readable medium of claim 15, wherein the wrapper is a JPEG file.

20. The at least one non-transitory computer-readable medium of claim 18, wherein the censored content includes a still image and instructions for accessing the trusted rendering engine and wherein the at least one of the one or more source contents is video content.

21. The at least one non-transitory computer-readable medium of claim 18, wherein the censored content includes an obscured version of at least one of the one or more source contents and instructions for accessing the trusted rendering engine and wherein at least one of the one or more source contents is video content.

22. A wrapper including a censored content data structure in a format that is renderable by a standard rendering engine, the censored content data structure comprising:
censored content comprising source content identification information which identifies one or more source contents corresponding to the censored content;
wherein the censored content data structure is configured to cause rendering of the censored content when opened by the standard rendering engine and wherein the censored content data structure is configured to cause rendering of the one or more source contents when opened by a trusted rendering engine;
wherein the censored content is in a first portion of the censored content data structure, data indicating an end of file is in a second portion of the censored content data structure, and information corresponding to at least one of the one or more source contents is in a third portion of the censored content data structure, wherein the standard rendering engine reads the first portion before the second portion and stops reading data after reading the data indicating an end of file in the second portion.

23. The wrapper of claim 22, wherein the censored content includes instructions to access the trusted rendering engine.

24. The wrapper of claim 23, wherein the instructions include a URL which provides access to the trusted rendering engine.

25. The wrapper of claim 23, wherein the at least one censored content data structure includes encrypted information used to retrieve at least one of the one or more source contents for rendering.

26. The wrapper of claim 22, wherein the wrapper is a JPEG file.

27. The wrapper of claim 25, wherein the censored content includes a still image and instructions for accessing the trusted rendering engine and wherein the at least one of the one or more source contents is video content.

28. The wrapper of claim 25, wherein the censored content includes an obscured version of at least one of the one or more source contents and instructions for accessing the trusted rendering engine and wherein at least one of the one or more source contents is video content.

* * * * *